Nov. 22, 1949  J. BRASTY  2,488,898
ARTICULATED BRACKET FOR BRIDGE LAMP ARMS OR THE LIKE
Filed June 18, 1948
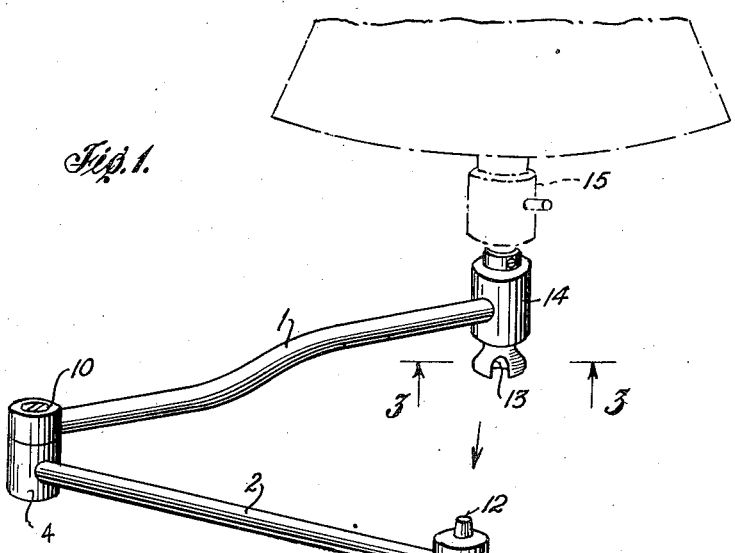
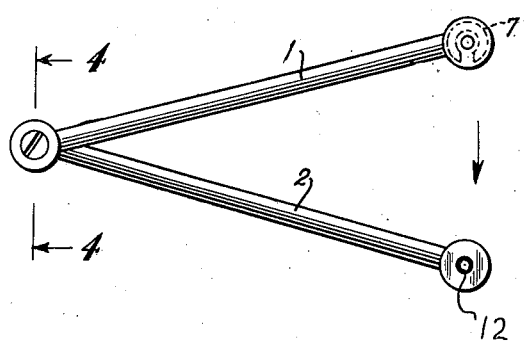
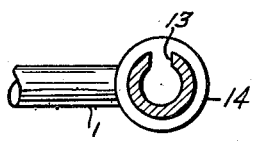
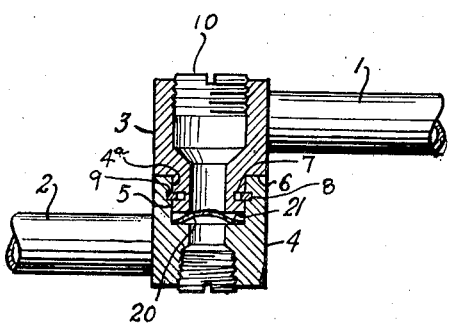
Inventor
Joseph Brasty
By West & Oldham
Attorneys Patented Nov. 22, 1949

2,488,898

UNITED STATES PATENT OFFICE 2,488,898

ARTICULATED BRACKET FOR BRIDGE LAMP ARMS OR THE LIKE

Joseph Brasty, Maple Heights, Ohio, assignor to Lamp Hardware, Inc., Cleveland, Ohio, a corporation of Ohio Application June 18, 1948, Serial No. 33,786

8 Claims. (Cl. 248—282)

This invention relates to articulated brackets, especially those of the type wherein two bracket arms are pivotally connected together for relative movement therebetween for supporting an object such as a bridge lamp in a variable position with relation to a support standard.

In articulated brackets of the above class, it is conventional to have the electrical conductors extending to the bridge lamp positioned within the bracket arms so as to form a convenient, hidden passage for the electrical conductor to the lamp. Since the bracket arms are pivotally connected together and are relatively movable, unless some special stop means are provided, the arms could be completely rotated with relation to each other and continued rotational movement would effect twisting of the conductor so as to break the insulation of same and cause short circuits and create a fire hazard.

Heretofore there have been various attempts made to provide articulated brackets of the above class wherein a desirable amount of movement was permitted by the mounting bracket but with the extent of such movement being positively limited so that one section of the articulated bracket might be rotated, from any intermediate position, in either direction to a position in which such bracket section is parallel with the other bracket arm or section. Previous patented constructions of this type are disclosed in Patents Nos. 2,048,313, 2,088,321 and 2,164,390. All of these patents find it desirable and necessary to limit the extent of movement of the bracket arms by means associated with the pivoted joint formed between the bracket arms. Such constructions have been relatively costly and have been of somewhat of a frail nature. Furthermore, due to the fact that there was a relatively long lever arm associated with such motion limiting means, the means had to be adapted to stand relatively great forces and such lever action on turning forces applied to the bracket arms might injure either the bracket arm or the motion limiting means.

The general object of the present invention is to avoid and overcome the foregoing difficulties with previous constructions and to provide an articulated bracket which is characterized by its positive motion control action.

A further object of the invention is to provide an inexpensive and sturdy articulated bracket of the class indicated above.

A further object of the invention is to provide an articulated bracket for bridge lamps or the like wherein the bracket can be compactly positioned for shipment or storage.

A further object of the invention is to provide an articulated bracket wherein the bracket arms are retained in a given position.

The foregoing and other objects and advantages of the invention will be made apparent as the specification proceeds.

Attention is directed to the accompanying drawings wherein:

Fig. 1 is a perspective view of an articulated bracket embodying the principles of the invention and showing it in association with a bridge lamp and support;

Fig. 2 is a plan of the bracket of Fig. 1;

Fig. 3 is a fragmentary section taken on the line 3—3 of Fig. 1; and

Fig. 4 is a fragmentary vertical section taken on the line 4—4 of Fig. 2.

In referring to the details of construction shown on the accompanying drawing, corresponding numerals will identify similar parts in the specification and drawings.

The articulated bracket of the invention primarily comprises two bracket arms 1 and 2 which are secured together for relative pivoted movement therebetween by means of any desired pivot means. In this instance the bracket arms 1 and 2 are tubular and are relatively straight. Each of the bracket arms 1 and 2 is provided with an offset end portion, which are indicated, respectively, at 3 and 4. Fig. 4 of the drawings best shows that the offset end 3 of the bracket arm 1 includes a sleeve extension section 5 which is of reduced external diameter so as to provide a shoulder 6 on the extension 3. The extension section 5 is adapted to extend into a counterbore 4ª formed in the tubular section 4 and be secured to the section 4 for relative rotational movement. In order to retain the articulated bracket arms 1 and 2 in assembled position and permit desired movement therebetween, a conventional split snap ring 8 is positioned in annular recesses 7 and 9 formed in the bore of the section 4 and in the wall of the extension section 5. Fig. 4 shows that the recess 7 is of a radial length equal to the radial width of the member forming the snap ring 8. Thus the split snap ring 8 is adapted to be compressed so as to fit into the recess 7 during assembly of the end portion 4 over the portion 3. When the end portions are in the desired association, the recess 9 will align with the recess 7 so the ring 8 will snap out to secure the end portions 3 and 4 together for relative pivotal movement. Clearance is provided between the end of the end portion 4 and the adjacent shoulder 6 provided on the end portion 3 when the bracket arms 1 and 2 are secured together.

Since the arms 1 and 2 normally are positioned for movement in horizontal planes, only a minimum binding or frictional force need be set up thereon so as to retain the bracket arms in a given position. Hence a spring washer 20 is positioned between a shoulder 21 formed at the end of the counterbore 4ª and the end of the section 5, and is compressed in such position to about one half its normal height. Usually a sealing plug 10 is in threaded engagement with the upper end of the section 3 to seal same but permit entry thereinto, if desired.

As a salient feature of the invention, the bracket arm 2, which is adapted to engage with a lamp support standard 11, is provided with an extension pin 12 thereon. This pin 12 is of such size and length so as to contact a portion of the bracket arm 1, or a member carried thereby, upon relative rotational movement of the bracket arms 1 and 2 about the pivoted joint formed therebetween. By contact of the extension pin 12 onto the bracket arm 11, relative movement of more than 360° between the bracket arms is prevented whereby twisting of electrical conductors received within the bracket arms 1 and 2 is prevented.

A further feature of the invention is that a slot 13 is formed in one wall of a tubular extension provided on a mounting member 14 that is secured to the free end of the bracket arm 1. This mounting member 14 is adapted to position a conventional lamp socket 15 and associated means threon. By forming the slot 13 in only one wall of the member 14, the arms 1 and 2 can be completely superimposed so as to provide a compact positioning of the bracket arms for storage or shipment. However, the remaining wall portion of the mounting member 14 will be contacted by the extension pin 12 to limit the relative movement of the bracket arms. It should be appreciated that the extension pin may be formed on either of the bracket arms and then the corresponding slot, recess, groove or other indentation will be formed on the other bracket arm or on a member carried thereby. The extension pin may be of any desired construction and may be located at a desired point. The construction shown effectively stops relative rotational movement between the bracket arms at the free ends of such arms whereby the movement is stopped by a minimum of force in contrast to the stop action heretofore provided at the pivoted joint formed between the bracket arms. Of course, the bracket arms, extension pin and the like all may be formed from any desired material. While no electrical conductor is shown passing through the arms 1 and 2 and joint formed therebetween, it will be realized that in operation a conventional insulated conductor will extend therethrough.

The member 14 may, of course, be integral with the bracket arm 1, or be a separate end piece secured thereto. Furthermore, the member 14 may merely serve as a support for a lamp support member. It also should be noted that the extension pin may be formed on a screw, plug or equivalent device removably carried by one of the bracket arms.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. An articulated bracket having a plurality of arms adapted to be swung to various positions, said bracket comprising one arm adapted to position a lamp assembly on one end thereof, a second arm adapted to engage at one end with a support standard, and means for securing said arms together at their other ends in substantially closely spaced parallel relation for pivotal movement therebetween, one of said arms having an extension pin associated with the free end thereof and extending therefrom sufficiently to contact the free end of the other of said arms and limit relative pivotal movement of said arms, the other of said arms being provided with a slot formed in the free end thereof from a margin thereof and extending into same past the center thereof for receipt of said extension pin to permit said arms to be moved into superimposed relation, said slot only extending partly through said other arm.

2. An articulated bracket having a plurality of arms adapted to be swung to various positions, said bracket comprising one substantially straight arm adapted to position a lamp assembly on one end thereof, a second substantially straight arm adapted to engage at one end with a support standard, the other ends of said arms being offset from the arms, and means for securing said arms together at their other and offset ends in substantially closely spaced parallel relation for pivotal movement therebetween, one of said arms having an extension pin associated with the free end thereof and extending therefrom sufficiently to contact the free end of the other of said arms to limit relative pivotal movement of said arms, the other of said arms being provided with a substantially tubular free end section having a slot formed in a wall of such end for receipt of said extension pin to permit said arms to be moved into superimposed relation.

3. An articulated bracket having a plurality of arms adapted to be swung to various positions, said bracket comprising one arm adapted to position a lamp assembly on one end thereof, a second arm adapted to engage at one end with a support standard, and means for securing said arms together at their other ends in substantially closely spaced parallel relation for pivotal movement therebetween, one of said arms having an extension member associated with the free end thereof with relation to the pivotal connection between said arms and extending therefrom sufficiently to contact an offset portion of the free end of the other of said arms at a point offset from the centerline thereof to limit relative pivotal movement of said arms so that said extension member and free end of the other arm will contact only when said arms are substantially superimposed on arcuate movement in one direction and when the arms are appreciably spaced angularly with relation to each other on arcuate movement in the opposite direction.

4. In a lamp support bracket, a pair of bracket arms, means pivotally securing said arms together in spaced relation to a free end of each arm, and an extension pin associated with a free end of one arm and extending therefrom for contact against the free end of the said other arm when said arms are attempted to be rotated about said pivot means, said other arm being provided with a local aperture extending only partially therethrough in the region thereof contacted by said extension pin to permit said arms to be superimposed but not to be completely rotated about said pivot means.

5. In a lamp support bracket, a pair of bracket arms, means pivotally securing end portions of said arms together in spaced relation for relative rotational movement, and an extension pin associated with a free end portion of one arm and extending therefrom for contact against a free end portion of said other arm when said arms are attempted to be rotated about said pivot means, said other arm being provided with a recess of relatively small area extending partially therethrough in the region thereof into which said extension pin can be swung to permit said arms to be superimposed by movement about said pivot means.

6. In a lamp support bracket, a pair of bracket arms having offset end portions at one end of each arm, means pivotally securing the offset ends of said arms together to position same in spaced relation for relative rotational movement, one end of each of said arms being free for movement about said pivot means, and an extension member centrally positioned on a free end of one arm and extending substantially axially therefrom, the other of said arms having an extension stop provided thereon offset from the center thereof extending substantially axially therefrom, said stop and extension member extending from the bracket arm positioning same towards the other bracket arm to permit the arms to be superimposed when moved arcuately with relation to each other in one direction.

7. In a lamp support bracket, a pair of bracket arms having offset end portions at one end of each arm, means pivotally securing the offset ends of said arms together to position same in spaced relation for relative rotational movement, one end of each of said arms being free for movement about said pivot means, and an extension member on a free end of one arm, the other of said arms having an extension stop provided thereon, said extension member having a portion thereof offset from the longitudinal center line of the offset end portion on which it is carried for contact with said extension stop, said stop and extension member extending from the bracket arm positioning same towards the other bracket arm to permit the arms to be superimposed when moved arcuately with relation to each other in one direction.

8. In a lamp support bracket, a pair of bracket arms, means pivotally securing said arms together in spaced relation for relative rotational movement, said arms having freely positioned ends, and an extension member on the free end of each of said arms and extending toward the other arm for contact with each other to limit relative rotational movement thereof in both directions but to permit said arms to be superimposed on relative rotational movement in one direction, each said extension member having a portion for contacting the other said extension member which portion is offset from the center vertical axis of the free end of such member.

JOSEPH BRASTY.

REFERENCES CITED

The following references are of record in the file of this patent:

UNITED STATES PATENTS

| Number | Name | Date |
|---|---|---|
| 612,772 | Haebler | Oct. 18, 1898 |
| 790,217 | Mason | May 16, 1905 |
| 999,283 | White | Aug. 1, 1911 |
| 2,242,303 | Irmischer | May 20, 1941 |